United States Patent [19]
von Phul

[11] Patent Number: 6,080,320
[45] Date of Patent: Jun. 27, 2000

[54] METHOD AND APPARATUS FOR REMOVING FOAMING CONTAMINANTS FROM HYDROCARBON PROCESSING SOLVENTS

[76] Inventor: Stephen A. von Phul, P.O. Box 1393, Weatherford, Tex. 76086-1393

[21] Appl. No.: 09/247,775

[22] Filed: Feb. 9, 1999

[51] Int. Cl.[7] .................................................. B01D 1/00
[52] U.S. Cl. ................. 210/703; 210/167; 210/221.1; 210/908; 95/242; 96/180; 202/264; 203/20; 261/DIG. 26; 585/833
[58] Field of Search ...................... 210/167, 194, 210/221.1, 703, 805, 908; 95/242; 96/176, 180; 202/264; 203/20; 252/321; 261/DIG. 26; 564/497; 585/833

[56] References Cited

U.S. PATENT DOCUMENTS

| | | | |
|---|---|---|---|
| 3,577,868 | 5/1971 | Muller et al. | 55/178 |
| 4,287,161 | 9/1981 | Agrawal | 210/694 |
| 4,849,027 | 7/1989 | Simmons | 261/DIG. 26 |
| 4,948,512 | 8/1990 | Gotlieb et al. | 210/705 |
| 5,587,004 | 12/1996 | Mogi | 95/242 |
| 5,662,790 | 9/1997 | Carlton et al. | 210/221.2 |

*Primary Examiner*—David A. Simmons
*Assistant Examiner*—Betsey J. Morrison
*Attorney, Agent, or Firm*—Geoffrey A. Mantooth

[57] ABSTRACT

A column of solvent containing foaming contaminants is provided. Gas is injected into the solvent in the column so as to generate foam in the column. Foam generation continues so as to push the foam up in the column, wherein much of the solvent that is in the foam is allowed to drain back down into the column. The drier foam is pushed out of the column and into a container. The foam is broken up into gas and the liquid foaming contaminants. The gas is vented and recirculated for injection into the column for foaming purposes. A portion of the liquid in the container is recirculated as a spray, which spray breaks up the foam. Another portion of the liquid in the container is recirculated into the column as reflux. Another portion of the liquid in the container is removed from the system in order to remove foaming contaminants therefrom.

16 Claims, 4 Drawing Sheets

METHOD AND APPARATUS FOR REMOVING FOAMING CONTAMINANTS FROM HYDROCARBON PROCESSING SOLVENTS

SPECIFICATION

1. Field of the Invention

The present invention relates to apparatuses and methods for removing contaminants that can cause foaming in solvents that are used to process hydrocarbons such as natural gas.

2. Background of the Invention

Hydrocarbon gas is frequently processed before storage, transportation through a pipeline or use. Processing removes undesirable components from the gas, such as moisture or sour contaminants.

Processing gas to remove moisture is referred to as dehydration. Hydrocarbon gas containing moisture is typically dehydrated by exposing it to the solvent triethylene glycol. The moisture is removed from the hydrocarbon gas in order to increase the heating value of the gas and to reduce the condensation of free liquid water during transportation or storage. The removal of the moisture also reduces the formation of gas hydrates that foul pipeline equipment.

In a typical glycol dehydration unit, the gas is dehydrated in a gas-liquid contactor, which is typically a tower. The wet gas enters the contactor at the bottom, while the dry gas exits from the top. Inside of the contactor, the gas passes through a shower of glycol solvent. The lean liquid solvent enters the contactor at the top and the rich liquid solvent (solvent containing moisture) exits the contactor from the bottom. The liquid solvent drains down inside of the contactor through a series of internal trays or packing. The gas is forced up through the solvent shower. When the gas physically contacts the liquid solvent, the water vapor in the gas is taken up by the solvent.

The rich solvent is processed for reuse. Reusing the solvent is desirable for environmental reasons (disposal of the solvent is both difficult and expensive) and also because the solvent is expensive. Processing the solvent removes the moisture wherein the solvent is said to be lean.

Processing gas to remove sour contaminants is referred to as sweetening. Sour gas smells like rotten eggs. The sour contaminants are sulphur compounds (for example, hydrogen sulfide). These sulphur containing compounds are removed because, when the compounds are combined with water, sulfuric acid is formed. Another contaminant in the gas is carbon dioxide. When the carbon dioxide is combined with water, carbonic acid is formed. Removing these acid forming contaminants is desirable in order to minimize corrosion in the vessels and pipelines used to store and transport the gas.

The gas sweetening process is similar to the dehydration process. The gas is forced upward through a shower of sweetening solvent in a gas-liquid contactor. The sweetening solvent is an amine solvent. The contaminants are removed by the sweetening solvent.

The sweetening solvent is processed for reuse, for the same reasons that the dehydration solvent is processed for reuse. Processing the solvent removes the sour contaminants.

In both the dehydration process and the sweetening process, the gas-liquid contactor requires careful balancing of the physical parameters of the gas and the liquid. When the contactor is in equilibrium, the gas exits out of the top and the rich solvent (the solvent being rich with either moisture or sour contaminants) exits out of the bottom, as described above. Also, when the system is in equilibrium, the amount of gas that is processed is maximized.

One sign that equilibrium is lost is when some of the liquid solvent is carried out of the contactor with the gas. This occurs if the gas rate through the contactor is too high or if the solvent contains relatively high concentrations of foaming contaminants. Such foaming contaminants include well treatment chemicals, liquid hydrocarbons (such as crude oil), corrosion inhibitors, suspended solids and excessive amounts of antifoam chemicals. Foaming is evident when the foam exits the top of the contactor. This is known as "carrying over" or "puking".

Foaming of the solvent is undesirable because foaming leads to a loss of efficiency of the contactor, causes contamination of the gas with the solvent, and results in the loss of the expensive solvent.

In the prior art, attempts have been made to solve the foaming problem. The prior art treats the solvent by passing it through activated carbon to adsorb the foam causing surfactants. In addition, the solvent is passed through filters to remove small suspended particles. Such particles stabilize the foam once it is formed.

The prior art systems suffered from several problems. The filters require replacement and disposal. Disposal of the used filters can be expensive due to environmental concerns. In addition, the filters themselves are expensive. Filters are also very specialized, being suited only to a narrow range of contaminant types or sizes. It is difficult to select a proper type of filter for the particular foaming contaminant present in the solvent. That is to say that the effectiveness of the filter is dependent on the filter matching the particular type of the foaming contaminant. Typically, the particular type of foaming contaminant is unknown, resulting in guess work as to the particular filter which is to be used.

SUMMARY OF THE INVENTION

It is an object of the present invention to provide a method and apparatus for removing foaming contaminants from hydrocarbon fluid processing solvents.

It is another object of the present invention to provide a method and apparatus for removing foaming contaminants from hydrocarbon fluid processing solvents while reclaiming the solvents.

The present invention provides a method of removing foaming contaminants from a solvent which is used to process hydrocarbon fluid. A column is provided, which column has a top end. The top end has an outlet that provides communication between the column and a container. The contaminated solvent is introduced into the column. Gas is injected into the contaminated solvent so as to generate foam in the column. The foam includes the gas, the solvent and the foaming contaminants. Foam generation is continued so as to push the foam up the column and allow a portion of the solvent in the foam to drain back down the column, wherein the foam at the top end of the column has less solvent than the foam that is lower down in the column. The foam is pushed out through the outlet and into the container. The solvent is removed from the column by way of a location that is below where the gas is injected.

In accordance with one aspect of the present invention, the gas that is injected is a non-oxidizing gas. The solvents used to process hydrocarbons are typically sensitive to oxygen in the atmosphere. By using the same gas that the solvent is designed to contact, the solvent is not degraded when the foaming contaminants are removed.

In accordance with another aspect of the present invention, the foam is broken in the container so as to separate the gas from the foaming contaminants. The gas is vented out of the container.

In accordance with another aspect of the present invention, the foaming contaminants are collected as a liquid at the bottom of the container. A portion of this liquid is recirculated by spraying the liquid into the foam so as to break the foam. By recirculating the foaming contaminants and using the contaminants to break the foam, the concentration of foaming contaminants is maintained.

In accordance with another aspect of the present invention, the vented gas is recirculated by reinjecting the gas into the column.

The liquid at the bottom of the container is removed and introduced into the column as reflux. The reflux contains a high concentration of foaming contaminants to solvent. Introducing reflux into the column allows recovery of the solvent that is in the reflux and also provides foaming contaminants to maintain foaming in the first column.

In accordance with another aspect of the present invention, the solvent that is used is that which is used to dehydrate hydrocarbon gas.

In accordance with another aspect of the present invention, the solvent that is used is that which is used to sweeten hydrocarbon gas.

The present invention also provides a system for processing hydrocarbon fluid utilizing solvent to remove contaminants from the gas. The contaminants are selected from the group consisting of water and sour. The solvent contains foaming agents. The system has a fluid-liquid contactor having a hydrocarbon fluid input, a hydrocarbon fluid output, a lean solvent input and a rich solvent output. A solvent recycler is connected between the lean solvent input and the rich solvent output. The solvent recycler includes a contaminant separator. The separator has a rich solvent input that receives solvent from the rich solvent output of the contactor and a lean solvent output that provides solvent to the lean solvent input of the contactor. The separator also has a contaminant outlet. The solvent circulates in a downstream direction through the solvent recycler. A foaming agent remover has an upstream solvent tap that is connected to the solvent recycler and a downstream solvent tap that is connected to the solvent recycler. The foaming agent remover comprises first and second columns, each of which has an upper end, and a conduit connecting the upper end so as to form a vessel. The first column comprises a solvent inlet that is connected to the upstream solvent tap, a gas inlet that is connected to a gas source, and a clean solvent outlet that is connected to the downstream solvent tap. The clean solvent outlet is located below the gas inlet. The second column comprises a spray liquid outlet and a foamate discharge outlet, the spray liquid outlet is connected to a sprayer located in the vessel so as to spray above the second column. The second column also comprises a gas outlet.

In accordance with one aspect of the present invention, the system has the gas outlet of the second column coupled to the gas inlet of the first column.

In accordance with still another aspect of the present invention, the gas inlet of the first column comprises a sparger located inside of the first column.

In accordance with still another aspect of the invention, the conduit is shaped like an inverted "U".

In accordance with still another aspect of the present invention, the first column comprises a reflux inlet and the second column comprises a reflux outlet that is connected to the reflux inlet of the first column.

The present invention removes the foaming contaminants from the solvent by causing the solvent to foam. The foam is pushed upward, allowing the solvent in the foam to drain back down. The foaming contaminants travel up while the clean solvent travels down for removal and reintroduction into the hydrocarbon gas processing unit. The foam is routed into another container where it is broken up in order to allow the foaming contaminants to drain into the container.

By processing in this manner a portion of the solvent in the hydrocarbon processing unit, the solvent is cleaned and foaming problems are eliminated, with minimal loss of the solvent itself.

DESCRIPTION OF THE PREFERRED EMBODIMENT

The present invention is useful for removing foam causing contaminants from solvent that is used to process hydrocarbons such as natural gas. Examples of hydrocarbon gas processing units include dehydration units 11 (see FIG. 1) and sweetening units 31 (see FIG. 2). The present invention can also be used on solvents that are used to process hydrocarbon liquids.

Dehydration units and sweetening units have solvent recycling equipment. The solvent recycling equipment takes the rich solvent and removes the moisture or sour contaminants to produce lean solvent.

Figure 3:
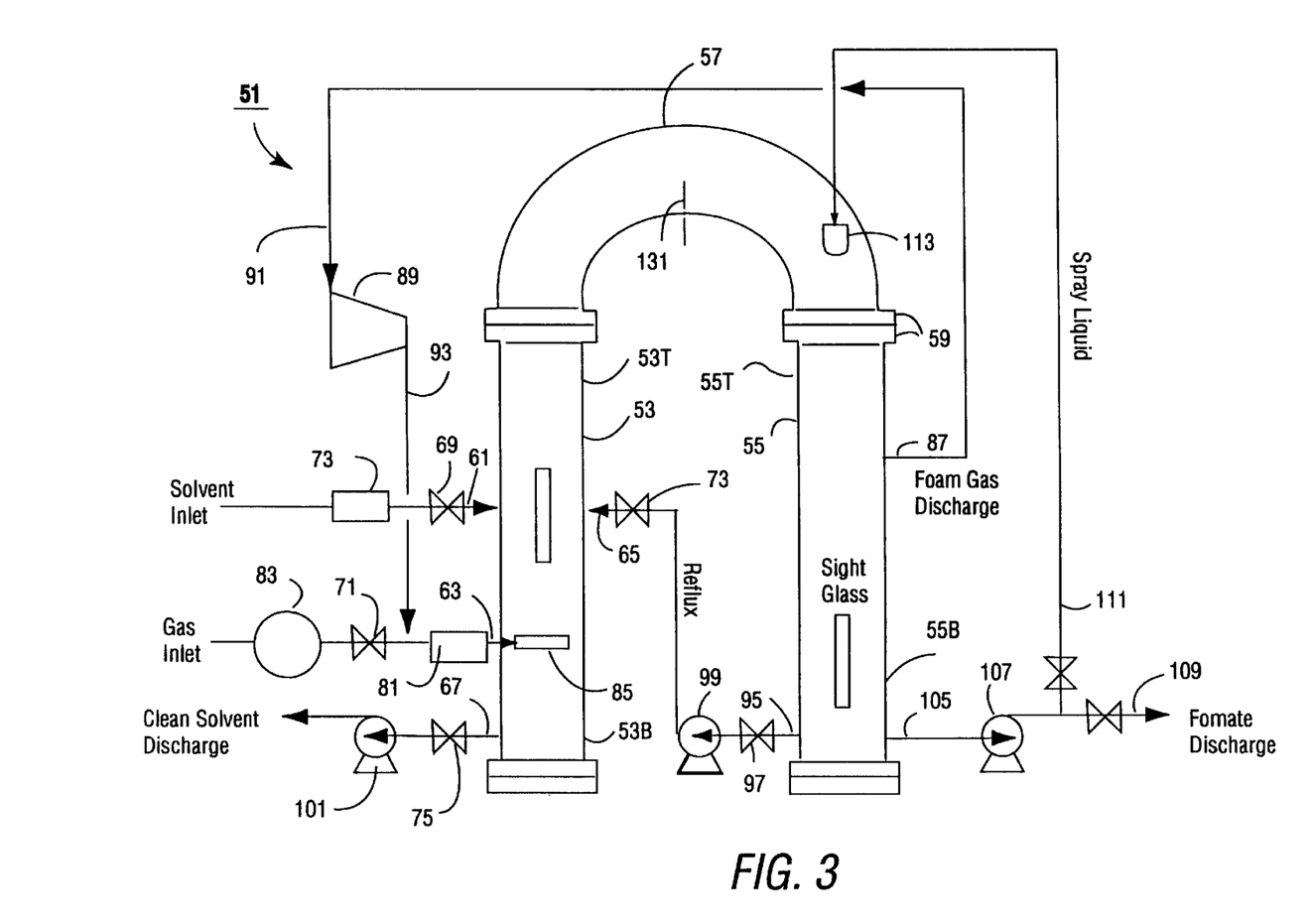
FIG. 3 is a side view of the apparatus of the present invention, in accordance with a preferred embodiment.
Figure 4:
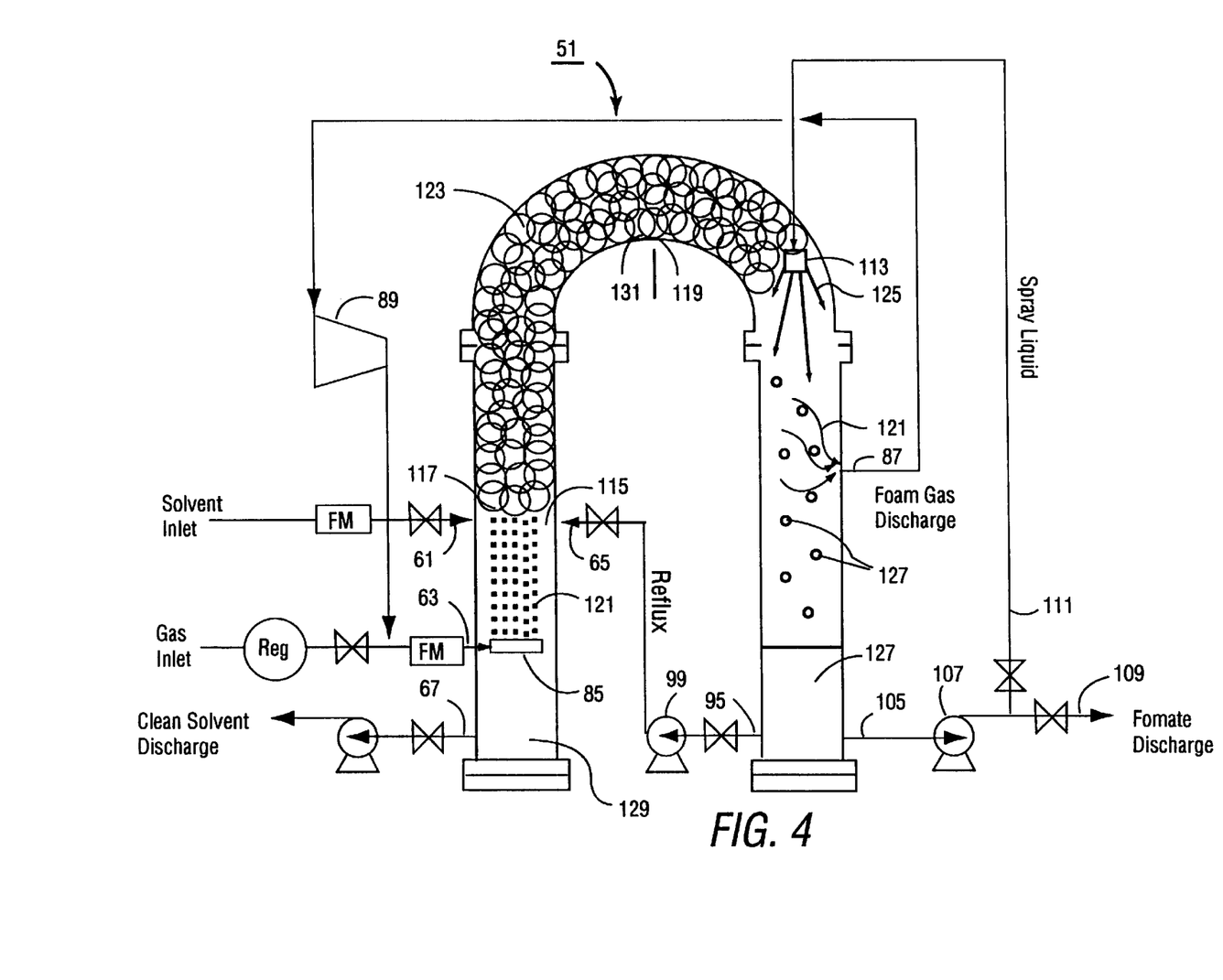
FIG. 4 is a cross-sectional view of the apparatus of FIG. 3, showing the operation thereof.

The foam remover apparatus 51 of the present invention can be installed and operated in conjunction with the solvent recycling equipment. As the solvent circulates through the gas-liquid contactor, it takes up contaminants (for example, moisture or sour contaminants) from the gas. The solvent may also take up foaming contaminants from the gas. The solvent exits the gas-liquid contactor and enters the solvent recycling equipment. The solvent recycling equipment will remove moisture and sour contaminants from the gas, but not the foaming contaminants. Consequently, some of the solvent is processed by the foam remover apparatus to remove the foaming contaminants. The hydrocarbon gas dehydration unit 11 (FIG. 1) will be first described, followed by a description of the hydrocarbon sweetening unit 31 (FIG. 2) and then by a description of the apparatus 51 itself (FIGS. 3 and 4).

Figure 1:
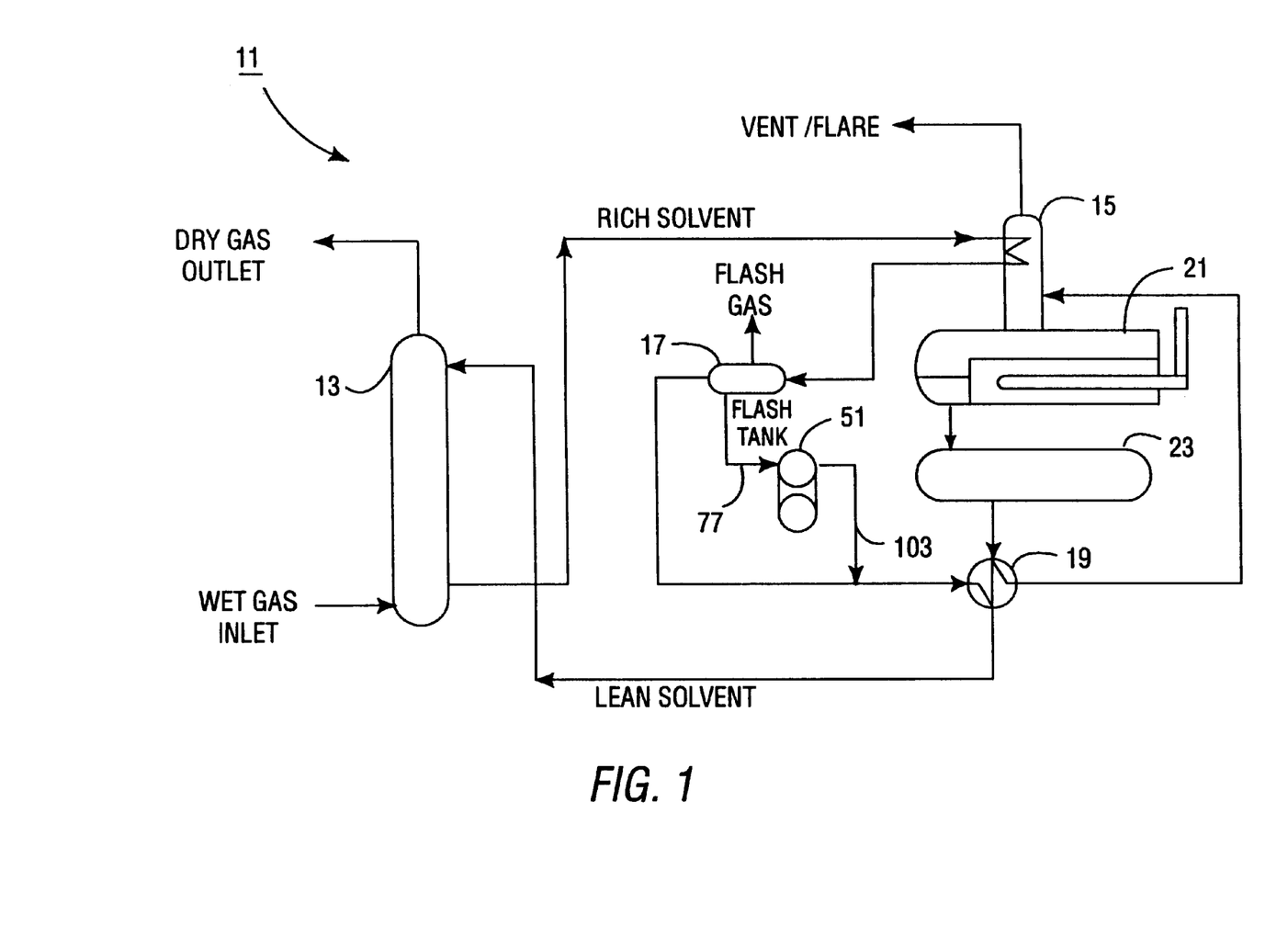
FIG. 1 is a schematic diagram showing a hydrocarbon gas dehydration plant, equipped with the apparatus of the present invention.

In the hydrocarbon gas dehydration unit 11 of FIG. 1, a gas-liquid contactor 13 is provided. The wet hydrocarbon gas enters the contactor 13 at the bottom, while the dry gas exits at the top. Lean solvent enters the contactor at the top, while rich solvent exits at the bottom. The gas is forced up through a solvent shower, wherein the moisture is transferred from the gas to the solvent.

The rich solvent exits the contactor 13 and is sent to solvent recycling equipment. Specifically, the solvent is sent to a heat exchanger located in a still 15. The heated mixture is then pumped to a flash tank 17, where the pressure is reduced. The increase in heat and the reduction in pressure allows any hydrocarbon gas that might be dissolved in the solvent to be removed. The degassed solvent then passes through a lean/rich heat exchanger 19 for the further preheating of the solvent. After passing through the heat exchanger 19, the solvent is introduced into a reboiler 21. Once in the reboiler, the solvent is heated to temperatures high enough to boil off the water vapor that was absorbed in the contactor. The solvent exiting the reboiler is referred to as lean solvent to indicate the absence of moisture. The clean, lean solvent is held in temporary storage in a surge tank 23. It is then pumped through the lean/rich heat exchanger 19 to preheat the rich solvent entering the reboiler. The lean solvent is then reintroduced into the contactor.

In the preferred embodiment, the solvent is a glycol type.

The foam remover apparatus 51 is inserted anywhere in the solvent processing lines. For example, the apparatus 51 can be located so as to receive some solvent from either the flash tank 17 or the surge tank 23. The clean solvent is discharged back into the processing system downstream of the tank.

Figure 2:
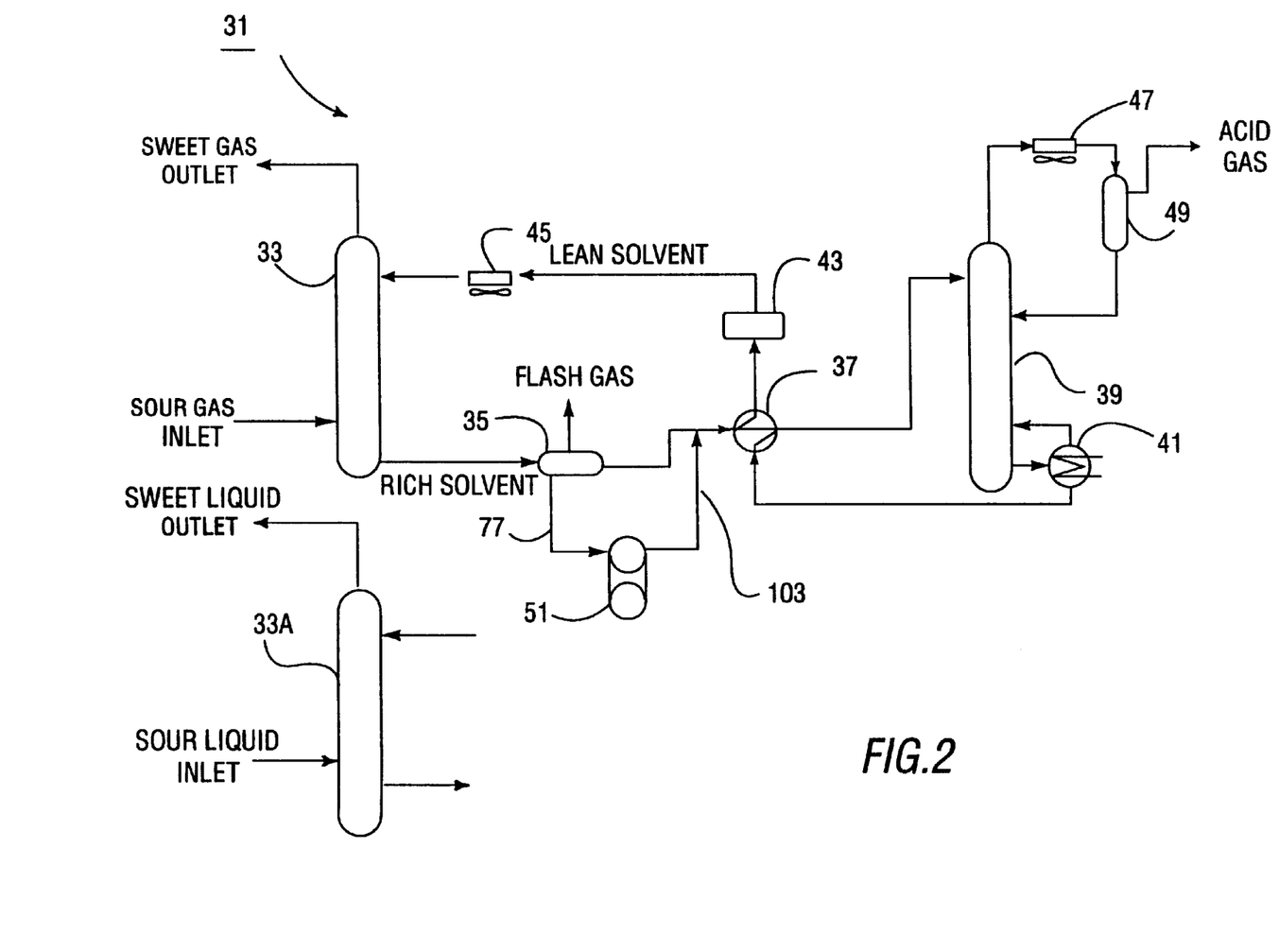
FIG. 2 is a schematic diagram showing a hydrocarbon gas sweetening plant, equipped with the apparatus of the present invention.

In the hydrocarbon gas sweetening unit 31 of FIG. 2, a gas-liquid contactor 33 is provided. The sour hydrocarbon gas enters the contactor 33 at the bottom, while the sweet gas exits from the top. Lean solvent enters the contactor 33 at the top, while rich solvent exits at the bottom. As with the dehydration unit, the gas is forced up through a solvent shower, wherein the sour contaminants are transferred from the gas to the solvent.

The rich solvent exits the contactor 33 and is sent to solvent processing equipment. Specifically, the solvent is passed through a flash tank 35 to remove any hydrocarbon gas and is then passed through a lean/rich heat exchanger 37. The solvent then enters a stripper/regenerator column 39, where it is exposed to steam from a reboiler 41. The sour compounds are stripped and exit with the steam out of the top of the column 39. A stripper overhead condenser 47 cools the gases. Water and solvent condenses out of the concentrated sour gas stream and are collected in a reflux accumulator 49. The recovered liquid is reintroduced into the column 39 as reflux in order to increase the stripping efficiency of the column. Clean solvent passes through the reboiler 41, the lean/rich heat exchanger 37, a surge tank 43 and into a lean solvent cooler 45. The temperature of the solvent is controlled in order to reduce condensation of the liquid hydrocarbons when the solvent contacts the hydrocarbon gas in the contactor 33.

In the preferred embodiment, the solvent is an amine type of solvent.

The foam remover apparatus 51 can be located anywhere in the solvent processing lines. For example, as shown in FIG. 2, the foam remover apparatus 51 draws solvent from the flash tank 35 and reinserts clean solvent downstream of the flash tank.

The apparatus 51 can process the solvent regardless of whether the solvent contains moisture or sour contaminants. Thus, the apparatus can tap into the solvent recycling system before the moisture or sour contaminants are removed from the solvent. It is preferred to tap into the solvent circulation system at a location where there is a liquid level of solvent.

The units 11, 31 are, with the exception of the foam remover 51, found in the prior art. If liquid hydrocarbons are processed, the contactor is a liquid-liquid contactor 33A (see FIG. 2).

Referring to FIG. 3, the foam remover apparatus 51 includes a first column 53, a second column 55 and a conduit 57 connecting the first and second columns. The columns 53, 55 are vertical and are of equal height. Each column has a top end 53T, 55T and a bottom end 53B, 55B and is formed by a pipe or tube. The two columns 53, 55 are located near each other. The top ends 53T, 55T of the columns are connected together by the conduit 57. The conduit 57 forms a channel between the two top ends. In the preferred embodiment, the conduit 57 is shaped like an inverted shallow "U".

In the preferred embodiment, the columns and conduit are made of steel pipe, although other materials can be used. The bottom end 53B of the first column is closed. Likewise, the bottom end 55B of the second column is closed. The top ends 53T, 55T are open. Thus, a vessel is formed where the interior of the first column 53 communicates with the interior of the second column 55 by way of the conduit 57.

Except for the inlets and outlets which are described below, the interior of the vessel 53, 55, 57 is sealed from the exterior.

In the preferred embodiment shown in FIG. 3, the columns and conduit are provided with flanges 59 at their ends for coupling purposes.

The apparatus 51 can be of any size. Some typical dimensions are: the first and second columns each have a diameter of 10 inches and a height of 550–600 inches. The first and second columns are 20 inches apart from each other. The conduit is 40 inches long and 20 inches high.

Still another set of typical dimensions are: the first and second columns each have a diameter of 24 inches and a height of 100–110 inches. The columns are 48 inches apart. The conduit is 86 inches long and 50–60 inches high.

Another set of typical dimensions are: the first and second columns each have a diameter of 36 inches and a height of 40–50 inches. The first and second columns are 70–80 inches apart. The conduit is 140–150 inches long and 60–80 inches high.

The first column 53 has several inlet lines and an outlet line. There is a solvent inlet 61, a gas inlet 63, a reflux inlet 65 and a solvent outlet 67. Generally, the solvent and reflux inlets 61, 65 are located above the gas inlet 63 and the gas inlet is located above the solvent outlet 67.

Each of the lines connected to the inlets and the outlet have a valve therein to control the flow therethrough. Thus, there is a solvent inlet valve 69, a gas inlet valve 71, a reflux inlet valve 73, and a solvent discharge outlet valve 75.

The solvent inlet 61 is connected to an upstream tap 77 in the solvent recycling system (see FIGS. 1 and 2). As previously discussed, this upstream tap 77 can tap into either rich or lean solvent. The solvent inlet 61 has a flow meter 79 therein.

The gas inlet 63 is connected to a source of gas. The gas should be a non-oxidizing or non-reacting gas. This is because the solvent is degraded if in contact with oxygen or other reactive gasses. One type of gas that is suitable is hydrocarbon gas, such as the gas that is being processed. In the preferred embodiment, a tap is placed on the gas outlet from the gas-liquid contactor. Another type of gas is nitrogen, which provides a margin of safety to the operator. The gas inlet 63 has a flow meter 81 therein. The gas inlet 63 also has a pressure regulator 83. The valve 71 can be located in series with and between the pressure regulator 83 and the flow meter 81, with the pressure regulator being upstream of the valve and the flow meter. The gas inlet 63 is connected to a sparger 85 that is located inside of the first column 53.

The gas that is injected into the apparatus is captured and reinjected. The second column 55 has a foam gas outlet 87 located above the liquid level. The foam gas outlet 87 extends to the input 91 of a compressor 89. The compressor output 93 is connected to the gas inlet 63 upstream of the flow meter 81. The compressor 89 can be regulated to adjust the flow and pressure of the gas.

The reflux inlet 65 is connected to a reflux outlet 95 located near the bottom 55B of the second column 55. The reflux outlet has a valve 97 that controls the reflux discharge from the second column. Downstream of the valve 97 is a pump 99, followed by the valve 73 that controls the input into the first column 53.

The solvent discharge outlet 67 has a valve 75 followed by a pump 101. The output of the pump 101 is connected to the solvent circulation system at a downstream tap 103 (FIGS. 1 and 2).

The second column 55 also has outlets and inlets. The foam gas outlet 87 and the reflux outlet 95 have been described above. There is a foamate outlet 105 located near the bottom of the second column 55. The outlet 105 extends to a pump 107. The output of the pump 107 is split between two lines, each of which has a valve. One line 109 is a foamate discharge and empties into a container such as a barrel. The other line 111 is connected to a spray head 113 that is located above the second column 55. The spray head 113 points down into the interior of the second column. The spray head can be located either in the second column or in the conduit 57. The two lines 109, 111 can be separated from each other.

The operation of the apparatus 51 will now be described referring to FIG. 4. Solvent containing foaming contaminants is taken from the solvent recycling system of the gas processing plant at the upstream tap 77. The solvent 115 is introduced into the first column 53 via the solvent inlet 61. The first column 53 is allowed to fill to a predetermined level with the solvent 115. Some distance is provided between the solvent level 117 and the midsection 119 of the conduit 57. The midsection 119 is the highest section of the conduit. Fluid located on one side of the midsection will fall into the first column, while fluid located on the other side will fall into the second column.

The gas 121 is then injected into the first column via the gas inlet 63 and the sparger 85. The gas 121 bubbles up through the contaminated solvent 115, causing foam 123. The foam 123 is made up of bubbles of the gas formed by the liquid. The liquid includes the solvent itself and the foaming contaminants therein. Such foaming contaminants include well treatment chemicals, suspended solids, liquid hydrocarbons, corrosion inhibitors, and even antifoaming agents (when present in excessive amounts). The injection of the gas 121 occurs continuously. Thus, as new foam is generated at the solvent-foam interface, this new foam pushes the older foam up in the first column 53. The result is that foam rises in the first column 53 and enters the conduit 57.

As the foam rises in the first column 53, it becomes drier. Much of the solvent drains away from the bubbles and back into the liquid 115 in the first column. As the foam dries, the liquid forming the bubbles becomes more and more concentrated with the foaming contaminants. Thus, providing the foam with some residence time above the first column before the foam reaches the midsection 119 is desirable because much of the solvent in the foam drains back to the liquid 115 in the first column.

The foam 123 is pushed up the first column 53 into the conduit 57 and over into the second column 55. As the foam crosses the midsection 119 of the conduit 57, it is relatively dry and thus only minimal amounts of solvent are transferred from the first column into the second column.

The foam 123 continues to be pushed down the conduit toward and into the second column 55. The foam is broken by a spray 125 produced by the spray head 113. The spray shears the bubbles open, releasing the gas 121 and allowing the liquid 127 to fall to the bottom of the second column 55. The gas 121 from the foam is vented at the foam gas outlet 87.

The liquid 127 in the bottom of the second column 55 contains the foaming contaminants and some solvent. However, the concentration of foaming contaminants to the solvent is much higher in the second column than in the first column.

A small portion of the liquid 127 in the second column 55 is removed at the foamate outlet 105 and is recirculated by the pump 107 and the spray line 111 through the spray head 113. Thus, the foam 123 is broken by a liquid 127 that contains the foaming contaminants. Recirculating the contaminated liquid 127 for use in breaking the foam maintains and even increases the concentration of foaming contaminants to solvent. The initial charge of liquid for the spray can be obtained from the first column.

An even smaller portion of the liquid 127 in the second column is discharged through the discharge line 109 and stored in one or more containers. This liquid can be disposed of or it can be processed to remove even more of the solvent, if desired.

Most of the liquid 127 (for example, 90%) in the second column 55 is withdrawn through the reflux outlet 95. The reflux is added by the pump 99 to the solvent 115 in the first column 53 at a location that is above the sparger 85. The reflux contains some solvent. By recirculating the reflux into the first column, this solvent can be recaptured. In addition, the reflux is useful for reinserting foaming contaminants into the first column. As the solvent 115 in the first column becomes cleaner, such that the foaming contaminants become less and less concentrated, foaming becomes difficult to establish. The foaming contaminants in the reflux serve to maintain foaming in the first column.

The creation of foam 123 in the first column 53 drives the foaming contaminants upwardly. Clean solvent 129, which contains very little foaming contaminants, descends below the sparger 85. The clean solvent 129 is withdrawn from the first column by the solvent outlet 67 and is reintroduced into the solvent recycling system at the downstream tap 103 (see FIGS. 1 and 2).

The level 117 of solvent in the first column 53 should be sufficiently below the midsection 119 of the conduit 57 so as to permit much of the solvent in the foam to drain back down into the first column 53.

The liquid levels in the first and second columns are maintained relatively constant. Likewise, the spray rate from the spray head 113 is maintained relatively constant. The solvent and gas inflow rates are adjusted to optimize foam formation. The dryness of the foam crossing over the conduit can be regulated by adjusting the residence time of the foam in and above the first column 53. The residence time is determined by the volume above the liquid level 117, the distance the foam has to rise before crossing the midsection 119 (wherein the foam falls into the second column) and the rate at which the foam is generated. The rate of foam generation is regulated by the solvent flow rate at the inlet 61, the gas flow rate at the inlet 63 and the reflux flow at the inlet 65. The gas flow rate can be adjusted by controlling volume or pressure or both. Increasing the liquid flow rate at the solvent inlet 61 and the gas flow rate at the gas inlet 63 will increase the production rate of foam. The foam thus moves up the first column faster, reducing its residence time above the first column, and having less time to drain solvent back into the first column. Decreasing the liquid and gas flow rates decrease the production rate of the foam and increases the residence time of the foam. The drier the foam in the conduit, the less solvent that is carried over into the second column. If the foam is generated quickly, as by an increased gas flow rate, the bubble size of the foam will be larger. This produces a foam that is relatively unstable. Such a foam may not be able to rise a great distance before collapsing. It is desirable to keep the foam intact until it can drain into the second column.

As the amount of contaminants in the solvent 115 in the first column 53 is reduced, the stability of the foam decreases. If the foam is too unstable, then it will break up before climbing high enough in the conduit to go over into the second column 55. The introduction of reflux by way of the inlet 65 maintains the level of contaminants in the first column at a level that is sufficient for foam generation.

The wetness of the foam can be measured by its conductivity. A conductivity sensor 131 can be placed in the conduit 57, at the midsection 119. High foam conductivity indicates a wet foam. Wet foam is caused by a high gas flow rate, wherein the residence time in the first column is short. High erratic conductivity also indicates a wet foam. A high gas flow rate causes large, unstable bubbles to form in the foam. The bubbles break easily, causing changes in the measured conductivity. A low conductivity indicates a drier foam. Also, the conductivity is likely to be more stable, because the foam is stable. The gas flow rate can be controlled based upon the conductivity of the foam in order to achieve the desired dryness. Furtherstill, as the concentration of the foaming contaminants decreases in the first column, the bubbles in the foam get larger and less stable, even with the use of reflux. Thus, conductivity provides a measure of how clean the solvent is in the first column.

Most of the liquid 127 in the second column is recirculated either as reflux or as spray. The outlet 109 draws small quantities of foamate out of the system, so as to maintain the level of the liquid 127 in the second column relatively constant.

Unlike filters, which are designed to remove only particular types of contaminants, the apparatus 51 of the present invention will remove any foaming agent including solids and liquids. Thus, the apparatus is independent of the type of foaming agent.

In addition, the solvents used in hydrocarbon gas processing plants are sensitive to oxidation. Non-reactive or non-oxidizing gas is used to generate the foam. The apparatus 51 provides a closed vessel that prevents the solvent from contacting the atmosphere.

Although the invention has been described as injecting gas into the first column by a sparger, the gas can be injected in other ways. For example, an eductor can be used at the solvent input to mix the solvent and the gas together during injection.

Because the apparatus uses the foaming contaminants already present in the solvent to generate foam, additional foaming agents are not added to the solvent. This is an important consideration from a practical point of view. A hydrocarbon plant operator is typically unwilling to allow the intentional introduction of foaming agents into the solvent, no matter what the stated purpose.

The foregoing disclosure and showings made in the drawings are merely illustrative of the principles of this invention and are not to be interpreted in a limiting sense.

What is claimed is:

1. A method of removing foaming contaminants from solvent which is used to process hydrocarbon fluids, comprising the steps of:
    a) providing a column having a top end, the top end having an outlet that provides communication between the column and a container;
    b) introducing the contaminated solvent into the column;
    c) injecting gas into the contaminated solvent so as to generate foam in the column, the foam comprising the gas, the solvent and the foaming contaminants;
    d) continuing to generate foam so as to push the foam up the column, and allowing a portion of the solvent in the foam to drain back down the column, wherein the foam at the top end of the column has less solvent than the foam that is lower in the column, and pushing the foam out through the outlet and into the container;
    e) removing the solvent from the column by way of a location that is below where the gas is injected.

2. The method of claim 1 wherein the step of injecting gas into the contaminated solvent further comprises the step of injecting a non-oxidizing gas.

3. The method of claim 1, further comprising the steps of:
    a) breaking the foam in the container so as to separate the gas from the foaming contaminants;
    b) venting the gas from the broken foam out of the container.

4. The method of claim 3 wherein the step of breaking the foam further comprises the step of spraying a liquid into the foam.

5. The method of claim 4, further comprising the steps of:
    a) collecting the foaming contaminants as a liquid at the bottom of the container;
    b) recirculating a portion of the liquid from the bottom of the container by spraying the liquid into the foam.

6. The method of claim 3, further comprising the step of recirculating the vented gas by reinjection into the contaminated solvent in the column.

7. The method of claim 1, further comprising the steps of:
    a) collecting the foaming contaminants as a liquid at the bottom of the container;
    b) removing a portion of the liquid from the container;
    c) introducing the removed liquid into the column as reflux.

8. The method of claim 1 wherein the hydrocarbon fluid comprises hydrocarbon gas, and the step of introducing the contaminated solvent into the column further comprises the step of introducing a solvent that is used to dehydrate the hydrocarbon gas.

9. The method of claim 1 wherein the hydrocarbon fluid comprises hydrocarbon gas, and the step of introducing the contaminated solvent into the column further comprises the step of introducing a solvent that is used to sweeten the hydrocarbon gas.

10. The method of claim 1, wherein:
    a) the step of injecting gas into the contaminated solvent further comprises the step of injecting a non-oxidizing gas;
    b) breaking the foam in the container, so as to separate the gas from the foaming contaminants;
    c) venting the gas from the broken foam out of the container;

d) recirculating the vented gas from the container by reinjection into the contaminated solvent in the column;

e) collecting the foaming contaminants as a liquid at the bottom of the container;

f) recirculating a portion of the liquid from the bottom of the container by spraying the liquid into the foam so as to break the foam;

g) removing a portion of the liquid from the container;

h) introducing the removed liquid into the column as reflux.

11. A system for processing hydrocarbon fluid utilizing solvent to remove contaminants from the hydrocarbon fluid, the contaminants being selected from the group consisting of water and sour, the solvent containing foaming agents, comprising:

a) a fluid-liquid contactor having a hydrocarbon fluid input, a hydrocarbon fluid output, a lean solvent input and a rich solvent output;

b) a solvent recycler connected between the lean solvent input and the rich solvent output, the solvent recycler comprising a contaminant separator, the separator having a rich solvent input that receives solvent from the rich solvent output of the contactor, a lean solvent output that provides solvent to the lean solvent input of the contactor and a contaminant outlet, the solvent circulating in a downstream direction through the solvent recycler;

c) a foaming agent remover having an upstream solvent tap connected to the solvent recycler and a downstream solvent tap connected to the solvent recycler;

d) the foaming agent remover comprising first and second columns, each of which has an upper end, and a conduit connecting the upper ends so as to form a vessel;

e) the first column comprising a solvent inlet that is connected to the upstream solvent tap, a gas inlet that is connected to a gas source, and a clean solvent outlet that is connected to the downstream solvent tap, the clean solvent outlet being located below the gas inlet;

f) the second column comprising a spray liquid outlet and a foamate discharge outlet, the spray liquid outlet being connected to a sprayer located in the vessel so as to spray above the second column, the second column also comprising a gas outlet.

12. The system of claim 11 wherein the gas outlet of the second column is coupled to the gas inlet of the first column.

13. The system of claim 11 wherein the gas inlet of the first column comprises a sparger located inside of the first column.

14. The system of claim 11 wherein the conduit is shaped like an inverted "U".

15. The system of claim 11 wherein the first column comprises a reflux inlet and the second column comprises a reflux outlet that is connected to the reflux inlet of the first column.

16. The system of claim 11, wherein:

a) the gas outlet of the second column is coupled to the gas inlet of the first column;

b) the gas inlet of the first column comprises a sparger located inside of the first column;

c) the conduit is shaped like an inverted "U";

d) the first column comprises a reflux inlet and the second column comprises a reflux outlet that is connect to the reflux inlet of the first column.

* * * * *